No. 735,478. Patented August 4, 1903.

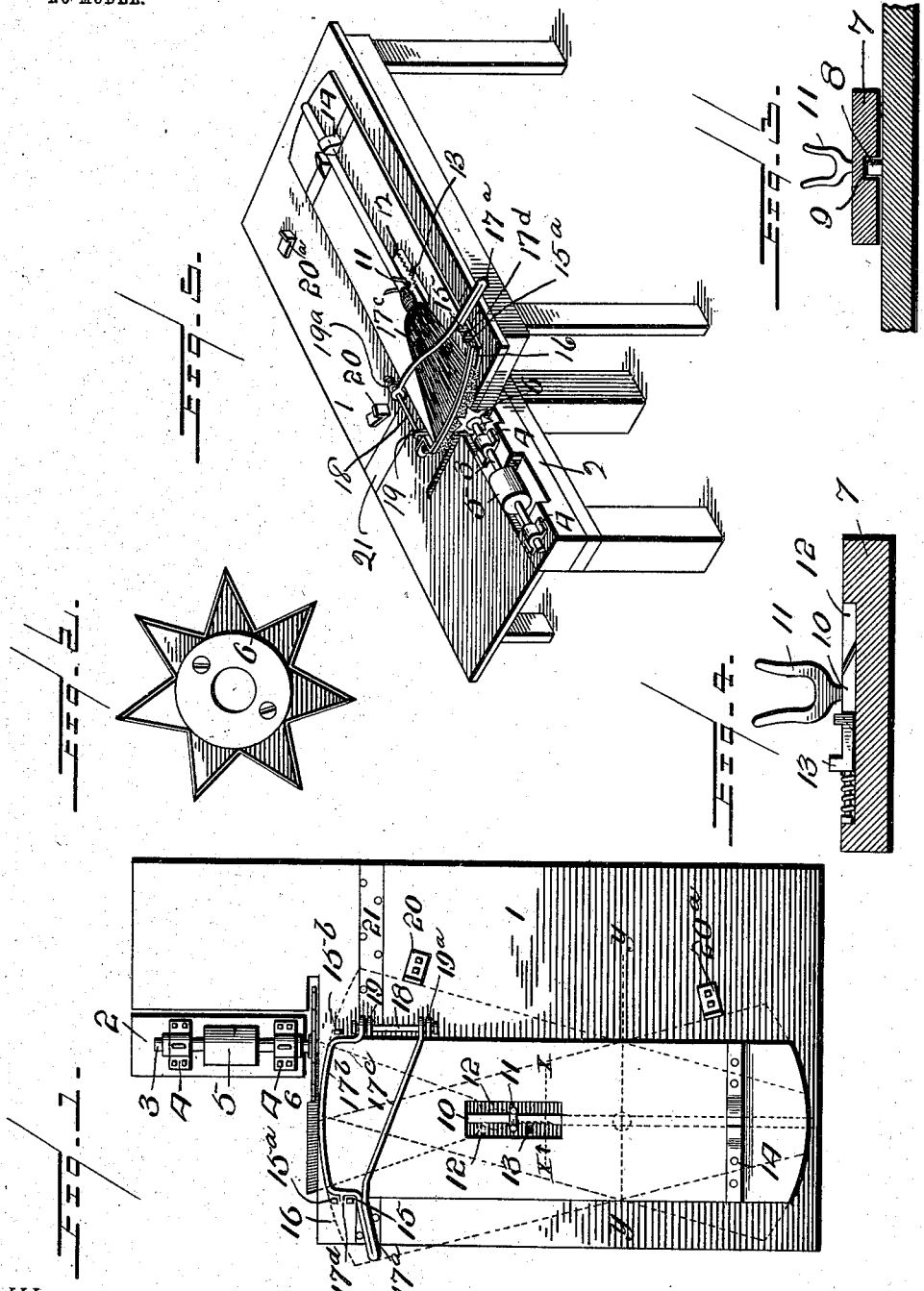

UNITED STATES PATENT OFFICE.

GEORGE W. DUVALL, OF DAVENPORT, IOWA, ASSIGNOR TO LEE BROOM & DUSTER CO., OF DAVENPORT, IOWA.

BROOM-CORN CUTTER.

SPECIFICATION forming part of Letters Patent No. 735,478, dated August 4, 1903.

Application filed April 10, 1902. Serial No. 102,159. (No model.)

*To all whom it may concern:*

Be it known that I, GEORGE W. DUVALL, a citizen of the United States of America, and a resident of Davenport, in the county of Scott and State of Iowa, have invented a certain new and useful Improvement in Broom-Corn Cutters; and I do declare the following specification, taken in connection with the drawings making a part of the same, to be a full, clear, and exact description thereof.

My invention relates to broom-corn cutters, and particularly to devices for trimming and evening up the ends of broom-corn after the same has been bound together for the purpose of making brooms or brushes, and its objects are to provide a machine which will have revolving cutting means and means by which the broom which is to be trimmed may be brought into contact with the cutting means and to provide a machine by which the uneven ends of broom-corn which have been bound together may be trimmed alike in all cases.

In the drawings, Figure 1 is a plan view of my invention. Fig. 2 is an enlarged side view of the revolving cutter. Fig. 3 is a vertical cross-section taken on the line Y Y of Fig. 1. Fig. 4 is a vertical cross-section on the line X X of Fig. 1 viewed in the direction of the arrow. Fig. 5 is a perspective view of that form of my invention which I prefer to use in practice.

1 represents the table or supporting-frame.

2 represents the supports on which the cutter-shaft is mounted.

3 is the cutter-shaft.

4 4 are shaft-bearings secured to the supports 2.

5 is the pulley, mounted on the shaft 3 to turn therewith.

6 is the cutter, which I prefer to construct with about seven teeth or blades, although this particular number is not essential to its successful operation.

7 is the oscillating broom-carrier.

8 is a pivot-post secured in the table 1.

9 is a socket provided in the under side of the broom-carrier 7 for the reception of the pivot-post 8.

10 represents a longitudinally-adjustable bar provided with notches along one of its edges.

11 is a fork, between the prongs of which the broom-handle is adapted to be placed and which fork is secured uprightly in the adjustable bar 10 and may be made integral therewith.

12 12 are guide-pieces secured to the broom-carrier 7 and between which the notched bar 10 is loosely secured.

13 is a spring-actuated dog located at right angles to the notched bar, one end of which is adapted to engage the notches of the bar 10, the other end being surrounded by a small spiral spring, which tends to keep the dog in engagement with one of the notches of the bar 10.

14 is a bracket provided with a notch or groove for the reception of the broom-handle near its outer end.

15, 15$^a$, and 15$^b$ represent vertical guide-posts secured to the inner end of the oscillating broom-carrier.

16 represents a plate fastened to the inner edge of the broom-carrier 7 to protect the said broom-carrier.

17 represents the broom-clamp, which will preferably be made in the form shown in Figs. 1 and 5, 17$^a$ being the handle or operating-lever thereof, while 17$^b$ and 17$^c$ are diverging branches thereof whose ends are connected by a rod or bolt 18, revolubly mounted in bearing-brackets 19 and 19$^a$, said bearing-brackets being rigidly secured to the broom-carriage 7.

17$^d$ is a lug secured to the broom-clamp 17, whose position, when the clamp is pressed down against the broom, is between the two guide-posts 15 and 15$^a$.

20 and 20$^a$ are stop-blocks to limit the oscillating movement of the broom-carrier 7.

21 is a metal strip secured to the table 1 and intended to facilitate the movement of the broom-carrier 7.

22 represents a broom placed upon the oscillating carrier 7 for the purpose of trimming off the irregular ends of the broom-corn.

In the manufacture of brooms one end of the broom-corn is secured to the lower end of the broom-handles and the free end of the corn is irregular in length and requires evening before the broom is ready for use or sale. By the use of my invention I accomplish this in the following manner: The oscillating carrier 7 is moved to the left, so that its edge strikes the stop-block 20. The clamp 17 is raised on the hinge formed by the bolt 18 and the broom is placed upon the oscillating carrier 7, the handle thereof resting on the fork 11 and bracket 14. The clamp 17 is then pressed down upon the broom-corn, the irregular ends of which project beyond the edge of the plate 16. By applying power in the usual well-known way to the cutter-shaft the cutter 6 may be made to revolve. The broom-carrier 7 is then swung on its pivot 8 9 so as to bring the broom-corn ends into contact with the revolving cutter, and when said carrier has been moved until it strikes the stop-block 20 the cutter will have trimmed off the irregular ends of the broom-corn which constitute the sweeper of the broom. By means of the movable notched bar 10 and the spring-actuated dog 13 the guide-fork 11 may be moved forward or backward to conform to different sizes of brooms which are to be trimmed.

Various modifications of my invention are possible, and I therefore do not wish to be understood as limiting myself to the particular form thereof which I have described and shown herein; but

What I claim, and desire to secure by Letters Patent, is—

1. In a broom-corn trimmer, a cutter and means for operating the cutter, a carrier suitably pivoted, and means for retaining the broom in fixed position to the carrier, comprising a handle and diverging branches, brackets secured to the carrier, and a pivot for the branches, supported by the brackets.

2. In a broom-corn trimmer, a cutter and means for operating the cutter, a carrier suitably pivoted, guides on the carrier, a notched bar slidable between the guides, a dog for engaging the notched bar, means on the notched bar to receive a broom-handle, and a pivoted clamp for the broom-corn, near the end of the carrier.

3. In a device for trimming broom ends, the combination of a revolubly-mounted shaft, a cutter mounted thereon to turn with said shaft, a table upon which are secured a pivot-post and stop-blocks, a carrier mounted to swing on said pivot-post and whose swinging movement is limited by the stop-blocks a bracket secured on said carrier, a notched bar mounted on said carrier and longitudinally adjustable thereon, a spring-actuated dog to engage the notches in the bar, a fork secured uprightly in said bar, a plate secured to the inner edge of the carrier, upright guide-posts 15, 15$^a$ and 15$^b$, brackets 19 and 19$^a$; means for holding the broom in place on the movable carrier.

In witness whereof I have hereunto set my hand, this 1st day of April, 1902, in the presence of two witnesses.

GEO. W. DUVALL.

Witnesses:
T. A. MURPHY,
A. G. SAMPSON.